United States Patent

Dollard et al.

[11] Patent Number: 5,085,742
[45] Date of Patent: Feb. 4, 1992

[54] SOLID OXIDE ELECTROCHEMICAL CELL FABRICATION PROCESS

[75] Inventors: Walter J. Dollard, Churchill Borough; George R. Folser, Lower Burrell, both of Pa.; Uday B. Pal, Cambridge, Mass.; Subhash C. Singhal, Murrysville, Pa.

[73] Assignee: Westinghouse Electric Corp., Pittsburgh, Pa.

[21] Appl. No.: 597,608

[22] Filed: Oct. 15, 1990

[51] Int. Cl.⁵ .................. H01M 6/00; H01M 8/00
[52] U.S. Cl. .................. 205/188; 29/623.5; 29/623.1; 427/115
[58] Field of Search .............. 29/623.5, 623.1; 204/15, 38.4; 427/115

[56] References Cited

U.S. PATENT DOCUMENTS

| | | | |
|---|---|---|---|
| 3,823,302 | 7/1974 | Muehlberger | 219/121 P |
| 3,839,618 | 10/1974 | Muehlberger | 219/121 P |
| 4,049,841 | 9/1977 | Coker et al. | 427/34 |
| 4,490,444 | 12/1984 | Isenberg | 429/31 |
| 4,597,170 | 7/1986 | Isenberg | 29/623.5 |
| 4,609,562 | 9/1986 | Isenberg et al. | 427/8 |
| 4,629,537 | 12/1986 | Hsu | 204/15 |

Primary Examiner—John Niebling
Assistant Examiner—Arun S. Phasge
Attorney, Agent, or Firm—Daniel P. Cillo

[57] ABSTRACT

A method to form an electrochemical cell (12) is characterized by the steps of thermal spraying stabilized zirconia over a doped lanthanum manganite air electrode tube (14) to provide an electrolyte layer (15), coating conductive particles over the electrolyte, pressurizing the outside of the electrolyte layer, feeding halide vapors of yttrium and zirconium to the outside of the electrolyte layer and feeding a source of oxygen to the inside of the electrolyte layer, heating to cause oxygen reaction with the halide vapors to close electrolyte pores if there are any and to form a metal oxide coating on and between the particles and provide a fuel electrode (16).

10 Claims, 1 Drawing Sheet

SOLID OXIDE ELECTROCHEMICAL CELL FABRICATION PROCESS

GOVERNMENT CONTRACT CLAUSE

The Government of the United States of America has rights in this invention pursuant to Contract No. DE-AC-21-80-ET17089, awarded by the United States Department of Energy.

BACKGROUND OF THE INVENTION

This invention relates to a new process for applying the solid oxide electrolyte and cermet exterior electrode of high temperature solid oxide electrochemical cells, such as fuel cells.

High temperature solid oxide fuel cell configurations are well known, and taught, for example, in U.S. Pat. No. 4,490,444 (Isenberg), herein incorporated by reference. There, a porous, calcia stabilized zirconia support tube, having a 50 micrometer to 500 micrometer thick, porous air electrode of, for example calcium, strontium, magnesium or zirconium oxide doped lanthanum manganite was taught, with an attached, axially elongated, narrow interconnection strip of calcium, strontium, or magnesium oxide doped lanthanum chromite. The air electrode was coated with a 20 micrometer to 50 micrometer thick, solid, non-porous, yttria stabilized zirconia electrolyte. A porous, nickel-zirconia cermet, exterior fuel electrode, about 50 micrometers thick, covered most of the electrolyte.

The interconnection and electrolyte were applied according to the teachings of U.S. Pat. No. 4,609,562 (Isenberg et al.), and the fuel electrode was applied according to the teachings of U.S. Pat. No. 4,597,170 (Isenberg), both involving vapor deposition techniques. This processing involves three separate expensive vapor deposition steps. Elimination of any of these would significantly reduce overall cell fabrication cost.

In making flat plate electrochemical converters, U.S. Pat. No. 4,629,537 (Hsu) teaches a lengthy and complicated process including: plasma spray depositing a flat, porous, stabilized zirconia electrolyte sheet on a carbon substrate, separating the sheet from the carbon substrate, sintering the sheet at 1,400° C. to 1,600° C. to densify the electrolyte to 96% of theoretical density, smoothing both of the flat surfaces, and then coating each side with a nickel-zirconia fuel electrode and a strontium doped lanthanum manganite oxidizer electrode by a dip slurry or flame deposition technique, to form a cell. Corrugated plate interconnectors of nickel and platinum alloy are then placed between cells.

It is a main object of this invention to provide an inexpensive, simplified fabrication process for making high temperature, tubular, solid oxide electrochemical cells.

SUMMARY OF THE INVENTION

Accordingly, the invention resides in a method of bonding an electrolyte, and an outer electrode layer on a porous, doped lanthanum manganite tubular electrode, characterized by the steps: thermal spraying yttria stabilized zirconia over a substantial portion of a porous, doped lanthanum manganite tubular electrode to provide a high temperature oxygen ion conductive electrolyte layer; forming a coating of particles of an electronic conductor on the electrolyte; pressurizing the outside of the electrolyte layer; feeding halide vapors of yttrium and zirconium to the outside of the electrolyte layer and then applying a source of oxygen to the inside of the porous, tubular electrode to contact the inside of the electrolyte layer; heating the tube and electrolyte to a temperature sufficient to cause oxygen reaction with the halide vapors closing electrolyte pores if there are any and inducing oxygen ions to diffuse through the electrolyte causing reaction with the halide vapors, to form a metal oxide coating on and between the particles of electronic conductor, which coating is attached to the electrolyte layer, providing an exterior electrode.

Preferably, a thin, axially elongated, narrow segment of electrically conductive ceramic oxide interconnection strip is applied to the lanthanum manganite air electrode tube by vapor deposition or plasma arc spraying as a first step. The thermal spraying is preferably plasma arc spraying. This method provides for elimination of electrolyte vapor deposition and produces an electrochemical cell with acceptable and stable high temperature performance.

BRIEF DESCRIPTION OF THE DRAWINGS

In order that the invention can be more clearly understood, convenient embodiments thereof will now be described, by way of example, with reference to the accompanying drawings in which.

DESCRIPTION OF THE PREFERRED EMBODIMENTS

Figure 1:
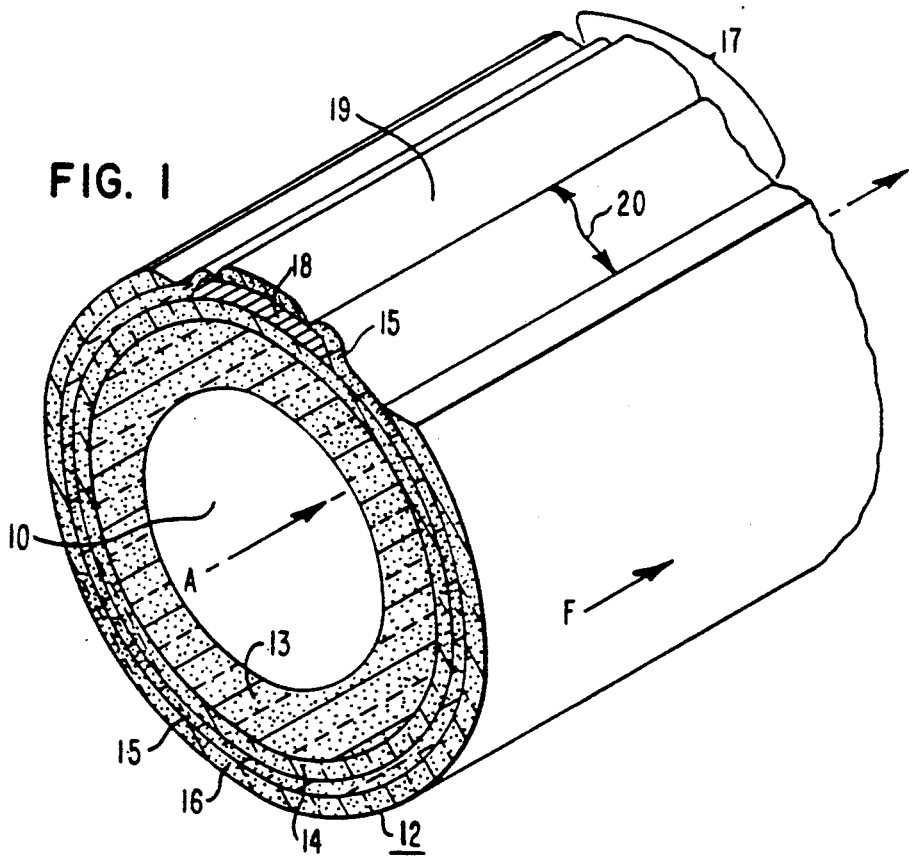
FIG. 1 is an isometric view in section of a preferred, tubular, solid oxide fuel cell which can be made according to this invention, and FIG. 2, which best illustrates this invention, is a block diagram of the method of this invention.

Referring now to FIG. 10 of the drawings, air A, flowing through the center 1 of electrochemical cell 12, for example, an operating high temperature fuel cell, permeates through optional porous support tube 13 comprising, for example, sintered calcia stabilized zirconia, to air electrode 14, where the oxygen is converted to oxygen ions at the surface of electrolyte 15. The oxygen ions are conducted through oxygen ion conducting electrolyte 15 to fuel electrode 16 where they react with fuel F, to generate electricity. Also shown in the drawing are: longitudinal space 17 containing an axially elongated interconnection 18, which extends down a narrow axial segment of the tube, for making electrical connections from the underlying air electrode to the fuel electrode of a cell tube (not shown) lying next to it, and an electronically insulating gap 20. A metal or fuel electrode type of material 19 can be coated over interconnection 18.

The air electrode 14 is a tube of porous, calcium, strontium, magnesium, or zirconium oxide doped lanthanum manganite, usually applied by a slurry dipsinter operation. Electrolyte 15 must be a solid material through which oxygen ions can diffuse. The electrolyte material is preferably an oxide having a fluorite structure or a mixed oxide in the perovskite family, but other simple oxides, mixed oxides, or mixtures of simple and mixed oxides can be used. The preferred electrolyte material is stabilized zirconia, a readily available commercial material. A useful composition is $(ZrO_2)_{0.90}(Y_2O_3)_{0.10}$ as that material works well in solid oxide fuel cells. The method of this invention is applicable to oxide layers that transfer oxygen in any form including monatomic oxygen as well as ionic oxygen.

Figure 2:
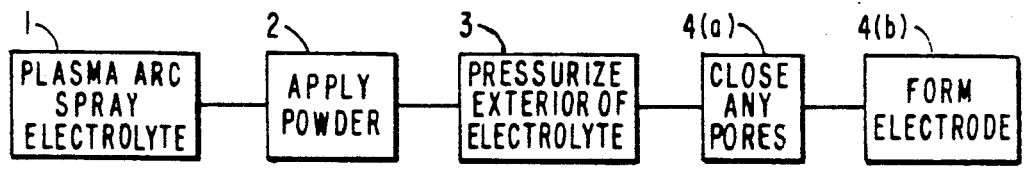

The electrolyte 15 is applied over a substantial portion of the inner, air electrode tube 14, as shown in FIG. 1, next to the narrow radial segment interconnection 18, which is usually applied first so that electrolyte can overlap it as shown. The electrolyte is applied by plasma arc spraying, step 1 of FIG. 2. This, in many cases, provides an electrolyte that has open pores, that is, from 5 vol. % to 15 vol. % porous (85% to 95% of theoretical density), where gas can pass through the structure. Prior electrolyte vapor deposition techniques always provided a closed pored structure.

Thermal spraying, such as plasma arc spraying or flame spraying is a well known technique, taught, for example, by U.S. Pat. Nos. 3,823,302 and 3,839,618 (Muehlberger) and U.S. Pat. No. 4,049,841 (Coker et al.), all herein incorporated by reference. Plasma spraying utilizes an electric arc discharge through which a plasma gas is passed, ionizing the gas to provide a plasma of ionized gas. This plasma is mixed with a powdered metal or metal oxide suspended in a carrier gas. Flame spraying involves fusing a metal containing powder onto a metallic surface with a flame which is generated by a torch or the like. These and similar techniques to hot spray metal containing powders will be considered covered by the term "thermal spraying".

An outer, porous, cermet fuel electrode 16 is then deposited over a substantial portion of the electrolyte 15, as shown in FIG. 1. First, particles of an electronic conductor are applied to the electrolyte surface, then a skeleton of yttrium and zirconium oxide is grown around the particles by a modified vapor deposition process. The preferred particles are nickel, cobalt, and alloys and mixtures thereof, as these metals are stable, sulfur resistant, and have an acceptable oxidation potential. The conductor particles may be applied to the electrolyte as a powder layer in many different ways, including slurry dipping, spraying, and tape transfer, step 2 in FIG. 2.

The material that binds the conductor particles to the electrolyte is formed from two reactants. The binding material is preferably selected to be the same material as the electrolyte so that a good bond forms between the binding material and the electrolyte and there is a good thermal match between the two materials.

The first reactant used to form the binding material is a source of oxygen such as water vapor, carbon dioxide, or oxygen itself, which is fed from the inside of the tube, through the optional support and the inner, porous, air electrode. The second reactant used to form the binding material are metal halides, which are fed to the outside of the tube. Chlorides are preferred as they are inexpensive and have acceptable vapor pressures. The reaction of the first and second reactants produces a metal oxide binding material. If the binding material is to be stabilized zirconia, it will be necessary to use a mixture of a zirconium halide and a halide of the stabilizing element as the second reactant. The proportion of the two halides in the mixture is selected to produce the desired composition of the binding material, and may not be the same as the proportion of the metals in the binding material, due to differences in the reaction rates of the two metal halides.

Since the electrolyte may be from 5 vol. % to 15 vol. % porous, and may be open pored, oxygen gas from inside the tube could undesirably oxidize the nickel or cobalt particles if the gas were allowed to leak completely through the thin electrolyte layer, and the pores in the electrolyte would not be filled by the skeletal binder. Thus, the outside of the electrolyte layer is pressurized either with gas or by applying a vacuum to the inside of the tube, that is, reactor pressure is increased so that a positive pressure gradient is provided across the electrolyte, where external pressure exceeds internal tube pressure.

The halide vapors of yttrium and zirconium are then fed to the outside of the electrolyte layer. If there are pores in the electrolyte, this allows the vapors to penetrate into the electrolyte layer without initiating deposition. At this point, step 3 in FIG. 2, no gases are fed inside the tube. Then a source of oxygen gas, such as air is slowly applied to the inside of the tube, where the gas contacts the inside of the electrolyte layer by passing through the air electrode. The tube is heated to a temperature over 1,000° C., so that the oxygen gas will react with the halide vapors to form oxides that will close any electrolyte pores that may be present. This is the chemical vapor deposition part of the process, step 4(a) in FIG. 2. The skeleton then grows around the metal particles by electrochemical vapor deposition, step 4(b) in FIG. 2, where oxygen ions diffuse through the electrolyte and further react with the halide vapors.

The gaseous oxygen and halide reactants and the electrolyte are heated to the temperature at which the electrolyte will conduct oxygen ions, and a reaction occurs to produce the binding material. This temperature is preferably about 1,000° C. to about 1,400° C. Typically, about 1 minute to about 30 minutes is required to produce sufficient binding material to adequately bind the conductor particles to the electrolyte. Of course, the reaction proceeds faster at higher temperatures. The reaction should be continued until the desired degree of binder material build up is obtained and the electrode is as strong as desired. High densities should be avoided for fuel electrodes as fuel electrodes must still be permeable to the gases used in operating a fuel cell. Since, in many cases, the thermal sprayed electrolyte is not close pored, the most desired situation is to pressurize the outside of the electrolyte during vapor deposition of the fuel electrode, as a precautionary measure.

Usually, the interconnection is applied before the electrolyte and is then masked by suitable techniques during plasma spraying of the electrolyte and chemical-/electrochemical vapor deposition of the outer fuel electrode. The interconnection should be non-porous and may be applied by chemical/electrochemical vapor deposition or plasma spraying techniques.

The following example further illustrates this invention.

EXAMPLE

A tube was prepared, approximately 400 mm long and 13 mm in diameter consisting of a 2 mm thick porous support tube of calcia stabilized zirconia, and a 1 mm thick, sintered, porous air electrode of doped lanthanum manganite on top of the support tube. The air electrode was masked except for an axial segment on which a doped lanthanum chromite material was chemical/electrochemical vapor deposited at 1,340° C., to provide an interconnection, shown as 18 in FIG. 1. Then the mask over the air electrode was removed and most of the interconnection area was masked.

The air electrode was then fixed to a lathe and rotated at 40 RPM to 60 RPM. A plasma gun, Model #SG-1B, by Plasmadyne, with the following spray parameters was used to spray yttria-stabilized zirconia electrolyte material over the air electrode:

Arc gas (argon): 50 cubic ft/hr
Powder gas (argon): 20 cubic ft/hr
Gun current: 1000 Amp
Spray distance between the gun and the air electrode surface: 3 inches
Number of spray passes: About 50

Subsequent scanning electron microscope (SEM) micrographs of a cross-section of the completed fuel cell showed that the plasma sprayed electrolyte attached well to the air electrode and the electrolyte, and was from 5 vol. % to 10 vol. % porous (90% to 95% theoretically dense). Plasma spraying parameters could be altered to provide a denser electrolyte layer which could be completely close pored. Electrolyte thickness varied from about 60 micrometers to 80 micrometers.

A 100 micrometer thick layer of approximately 3 to 7 micrometer diameter nickel powder was deposited over the electrolyte by means of slurry dipping. The tube was then placed in a graphite lined reactor tube in a furnace and a second tube was inserted into the cell tube to provide for a flow of oxygen through the inside of the cell tube. The furnace was heated to 1,200° C.

Reactor pressure was increased to 20 mm Hg. This would prevent the oxidizing gases later fed inside the tube from oxidizing the Ni by leaking through any electrolyte pores. Then, a mixture of vapors containing 0.65 grams zirconium tetrachloride per minute and 0.1 gram of yttrium chloride per minute was fed to contact the outside of the electrolyte.

For 1½ minutes, after starting the chloride feed, no oxygen containing gas was passed inside the tube. This allowed the chlorides to penetrate the porous electrolyte surface without initiating deposition. The oxidizing gases were then slowly introduced inside the tube and they then reacted with the chlorides within the porous electrolyte to seal any pores of the electrolyte by chemical vapor deposition. Electrochemical vapor deposition continued, and the fuel electrode was fixed to the electrolyte after about 10 minutes. SEM micrographs showed a skeleton of yttria stabilized zirconia had grown between the nickel particles, bonding them to the electrolyte, to provide a fuel cell structure.

The fuel cell was then tested at 1,000° C., with 85% fuel utilization and 250 mA/cm² current density. It operated at a cell voltage of 0.595 V. and was stable for 650 hours. Cell resistance was approximately 0.75 ohm cm² to 0.80 ohm cm² which was slightly high but would be lowered by depositing a thinner electrolyte layer. Acceptable and stable high temperature performance was shown using this dual, plasma spray—chemical-/electrochemical vapor deposition process, which process should significantly lower the fabrication cost of the cells.

We claim:

1. A method of bonding an electrolyte, and an outer electrode layer on a porous, doped lanthanum manganite tubular electrode, comprising the steps:

(A) thermal spraying a thin, axially elongated, electrically conductive, ceramic oxide interconnection strip over a narrow segment of a porous, doped lanthanum manganite tubular electrode, and then (B) thermal spraying yttria stabilized zirconia over the remaining portion of the lanthanum manganite tubular electrode to provide a high temperature oxygen ion conductive electrolyte layer having an open pore structure, which overlaps a portion of the interconnection strip, and then (C) forming a coating of particles of an electronic conductor on the electrolyte, and then (D) pressurizing the outside of the electrolyte layer, and then (E) feeding halide vapors of yttrium and zirconium to the outside of the electrolyte layer, where the vapors penetrate into the pores of the electrolyte without initiating formation of a metal oxide, and then applying a source of oxygen to the inside of the porous, tubular electrode to contact the inside of the electrolyte layer, and then (F) heating the tube and electrolyte to a temperature sufficient to cause oxygen reaction with the halide vapors, closing electrolyte pores, and inducing oxygen ions to diffuse through the electrolyte causing reaction with the halide vapors, to form a metal oxide coating on and between the particles of electronic conductor, which coating is attached to the electrolyte layer, providing a porous exterior electrode.

2. The method of claim 1, where the thermal spraying is plasma arc spraying.

3. The method of claim 1, where the particles of electronic conductor coated in step (C) are nickel particles.

4. The method of claim 1, where the halide vapors used in step (E) are chloride vapors.

5. The method of claim 1, where the tube and electrolyte are heated in step (F) at from 1,000° C. to 1,400° C.

6. The method of claim 1, where the oxygen-halide reaction in step (F) is a chemical vapor deposition followed by an electrochemical vapor deposition.

7. The method of claim 1, where the source of oxygen in step (E) is selected from the group consisting of water vapor, carbon dioxide, and oxygen.

8. The method of claim 1, where the open pore electrolyte formed in step (B) is from 5 vol. % to 15 vol. % porous, and where the interconnection formed in step (A) is non-porous.

9. The method of claim 1, where the pressurization in step (D) is by either pressurizing with a gas or applying a vacuum to the inside of the tube, where in all cases, external pressure exceeds internal pressure.

10. The method of claim 1, where, during step (B) a central portion of the interconnection strip is masked before thermal spraying of the electrolyte, and during step (E) no gases are fed inside the tube until after halide vapors have penetrated the electrolyte.

* * * * *